Kaufmann & Weber,
Butter Dish,
N°. 82,005. Patented Sep. 8, 1868.
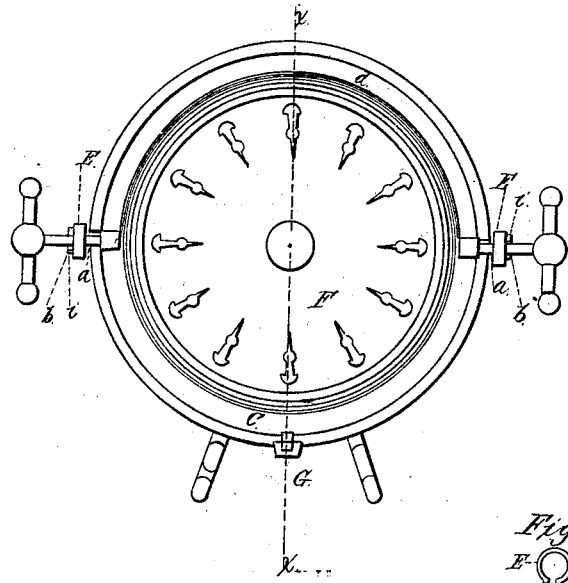
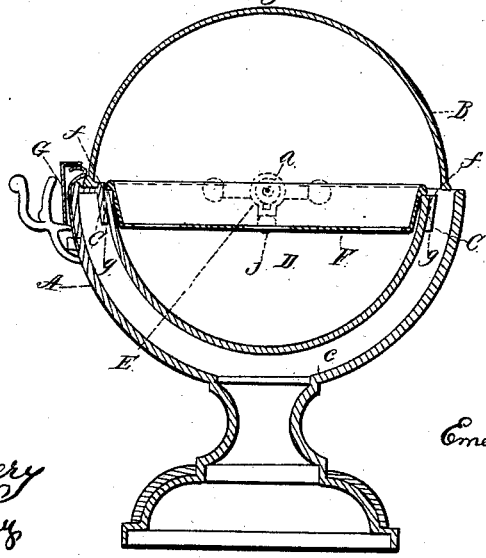
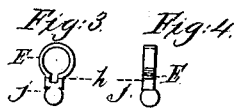
Witnesses:
W. H. Emery
Willard Emery
Inventors:
Ernest Kaufmann,
Antony Weber,
By their Attorney
Stephen Ustick.

United States Patent Office.

ERNEST KAUFMANN AND ANTONY WEBER, OF PHILADELPHIA, PENNSYLVANIA, ASSIGNORS TO ERNEST KAUFMANN.

Letters Patent No. 82,005, dated September 8, 1868.

IMPROVED BUTTER-COOLER.

*The Schedule referred to in these Letters Patent and making part of the same.*

TO ALL WHOM IT MAY CONCERN:

Be it known that we, ERNEST KAUFMANN and ANTONY WEBER, of the city and county of Philadelphia, and State of Pennsylvania, have invented a new and useful Improvement in Butter-Coolers; and we do hereby declare that the following is a full and exact description thereof, reference being had to the accompanying drawings, and to the letters of reference marked thereon.

The nature of our invention consists, in the first place, in making the drip-chamber removable, so as to readily clean out the lower part of the cooler. Heretofore the chamber has been made fast, and no provision made to clean out the space into which the cover turns.

In the second place, it consists of slip-collars, which hold the journals or pivots of the cover in place, instead of detachable caps, ordinarily used, which are liable to get mislaid or lost when the cover is taken off to clean it.

In the third place, it consists of a spring-fastening for the cover, which holds it securely in place.

In the accompanying drawings, which make a part of this specification—

Figure 1 is a plan or top view of the cooler, with the cover turned down into the space $e$.

Figure 2 is a vertical section, at the line $x\ x$ of fig. 1.

Figures 3 and 4 are views, at right angles with each other, of one of the slip-collars E.

Like letters in all the figures indicate the same parts.

A is the lower part of the cooler. B is the cover, whose journals $a\ a$ have bearings, $b\ b$. C is a ring, which is attached one-half around the part A, and which is cut away on its outside the other half, to form the slot $d$, for the cover B to be turned down through into the space $e$, in opening the cooler. D is the drip-chamber, whose rim $f$ rests in the annular rebate $g$ of the ring C. We make said chamber separate from the part A, as described, so that the space $e$ may be readily cleaned out. In ordinary coolers, the said chamber is made fast, and consequently no provision is made for cleaning out the space.

Instead of forming the upper half of the bearings for the journals $a$ of loose pieces, as in the ordinary coolers, which are liable to be mislaid or lost, we provide collars E, which are slipped around the bearings $b\ b$ and the journals $a\ a$. The said collars have slots, $h\ h$, which provide for slipping them over the feathers $i\ i$, to bring them into their places. Then the weighted end $j$ causes them to turn partly around, as seen in fig. 2, to prevent them slipping back. One of said collars E is represented in detail in figs. 3 and 4. F is the butter-plate. G is a spring, for holding the cover B in place, as seen in fig. 2.

What we claim as our invention, and desire to secure by Letters Patent, is—

1. The construction of the part A with the ring C, and combining the chamber D therewith, substantially in the manner and for the purpose above described.

2. The combination of the slip-collars E, journals $a\ a$, and bearings $b\ b$, with the part A, and cover B, and spring C, substantially as described, and for the purpose set forth.

In testimony that the above is our invention, we have hereunto set our hands, and affixed our seals, this twenty-sixth day of June, 1868.

<div style="text-align:right">
ERNEST KAUFMANN. [L. S.]<br>
ANTONY WEBER. [L. S.]
</div>

Witnesses:
STEPHEN USTICK,
JOHN WHITE.